United States Patent
Fang et al.

(10) Patent No.: US 10,345,976 B2
(45) Date of Patent: Jul. 9, 2019

(54) TOUCH PANEL WET STATE DETECTION METHOD AND CAPACITIVE TOUCH APPARATUS

(71) Applicant: SHENZHEN GOODIX TECHNOLOGY CO., LTD., Shenzhen (CN)

(72) Inventors: Jun Fang, Shenzhen (CN); Shuang Wu, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 123 days.

(21) Appl. No.: 15/709,443

(22) Filed: Sep. 19, 2017

(65) Prior Publication Data

US 2018/0120972 A1 May 3, 2018

Related U.S. Application Data

(63) Continuation of application No. PCT/CN2016/103984, filed on Oct. 31, 2016.

(51) Int. Cl.
G06F 3/041 (2006.01)
G06F 3/044 (2006.01)

(52) U.S. Cl.
CPC ............ G06F 3/044 (2013.01); G06F 3/0418 (2013.01)

(58) Field of Classification Search
CPC . G06F 3/03; G06F 3/038; G06F 3/041; G06F 3/045; G09G 3/36; G01R 27/26
See application file for complete search history.

(56) References Cited

U.S. PATENT DOCUMENTS

| | | | | |
|---|---|---|---|---|
| 2013/0207935 A1* | 8/2013 | Toda | ...................... | G06F 3/0418 345/174 |
| 2015/0242051 A1* | 8/2015 | Ng | ......................... | G06F 3/0418 345/174 |
| 2016/0148402 A1* | 5/2016 | Landau | ................. | G06F 3/0488 345/173 |
| 2016/0266717 A1* | 9/2016 | Oral | ....................... | G06F 3/0418 |

FOREIGN PATENT DOCUMENTS

| | | |
|---|---|---|
| CN | 103376963 A | 10/2013 |
| CN | 104391616 A | 3/2015 |
| CN | 106055136 A | 10/2016 |
| EP | 3065035 A1 | 9/2016 |
| JP | 8-123618 A | 5/1996 |
| JP | 2012088899 A | 5/2012 |
| WO | 2015074272 A1 | 5/2015 |
| WO | 2015199602 A1 | 12/2015 |

* cited by examiner

*Primary Examiner* — Pegeman Karimi (57) ABSTRACT

Embodiments of the present disclosure provide a touch panel wet state detection method and a capacitive touch apparatus. The method includes: acquiring reference feature data obtained by statistical counting of sample feature data output by a coupling capacitor when a medium between electrodes of each coupling capacitor in a capacitor array network is air; and acquiring real-time feature data output by the coupling capacitor in the capacitor array network, and determining, according to the real-time feature data output by the coupling capacitor and the reference feature data, whether the coupling capacitor is in a wet state. According to embodiments of the present disclosure, when a touch panel of a terminal is in a wet state, the touch functions can be selectively adjusted, or a part of power supplies in the circuit may be closed.

16 Claims, 10 Drawing Sheets

TOUCH PANEL WET STATE DETECTION METHOD AND CAPACITIVE TOUCH APPARATUS

CROSS REFERENCE TO RELATED APPLICATIONS

The present application is a continuation of international application No. PCT/CN2016/103984 filed on Oct. 31, 2016, which is hereby incorporated by reference in its entirety.

TECHNICAL FIELD

Embodiments of the present disclosure relate to the field of touch technologies, and in particular, relate to a touch panel wet state detection method and a capacitive touch apparatus.

BACKGROUND

The touch technology, when applied to a smart terminal, enables a user to operate the terminal only by means of gesture operations. As such, a traditional mechanical keyboard is not necessary, such that man-machine interaction is simpler and more direct. The touch technology may be categorized based on the induction principle into: resistive touch technology, capacitive touch technology, surface acoustic wave touch technology, and optics touch technology. At present, the capacitive touch technology is most commonly used on the smart terminals.

A capacity touch panel (CTP) operates based on current induction of a human body. When a user touches the CTP, due to the electric field of the human body, a finger of the user forms a coupling capacitor with a working surface, and a series of touch operation functions are implemented by detecting the capacitance value of the coupling capacitor.

The capacitive touch technology may also be categorized into surface capacitive touch technology and projective capacitive touch technology. At present, the projective capacitive touch technology is more widely used by the smart terminal manufacturers. In the projective capacitive touch technology, upper and lower electrodes are refined to a matrix distribution, and are cross-distributed along the X axis and Y axis to form a capacitor matrix. When the finger touches the electrodes, capacitance variations at the touch position may be detected by scanning the X and Y axes, such that the touch position of the finger is calculated, and hence a series touch operation functions are implemented.

However, during use of a smart terminal, the screen of the terminal may be wetted, such that all the functions of the touch operations are hard to be implemented or some damages may be caused to the terminal. Therefore, it is necessary to disenable all or a part of the touch functions to prevent mis-operations caused by accidental touches, or close some power supplies in the circuit to prevent short circuit, for example, power supply of the USB.

Accordingly, it is urgently desired to provide a wet (moisture, or water) state detection method and apparatus, after a touch panel of a terminal is taking in water or flooded, to selectively adjust the touch functions, or close a part of power supplies in the circuit.

SUMMARY

Objectives of embodiments of the present disclosure are to provide a touch panel wet state detection method and a capacitive touch apparatus, to at least solve the above problem in the related art.

To achieve the objectives of embodiments of the present disclosure, embodiments of the present disclosure provide a touch panel wet state detection method. The method includes:

acquiring reference feature data counted according to sample feature data output by a coupling capacitor when a medium between electrodes of each coupling capacitor in a capacitor array network is air; and acquiring real-time feature data output by the coupling capacitor in the capacitor array network, and determining, according to the real-time feature data output by the coupling capacitor and the reference feature data, whether the coupling capacitor is in a wet state.

To achieve the objectives of embodiments of the present disclosure, embodiments of the present disclosure provide a capacitive touch apparatus. The capacitive touch apparatus includes: a processor and a capacitor array network; wherein the processor is configured to acquire reference feature data obtained by statistical counting according to sample feature data output by a coupling capacitor when a medium between electrodes of each coupling capacitor in a capacitor array network is air; and acquire real-time feature data output by the coupling capacitor in the capacitor array network, and determine, according to the real-time feature data output by the coupling capacitor and the reference feature data, whether the coupling capacitor is in a wet state.

In embodiments of the present disclosure, reference feature data obtained by statistical counting of sample feature data output by a coupling capacitor when a medium between electrodes of each coupling capacitor in a capacitor array network is air is acquired; and real-time feature data output by the coupling capacitor in the capacitor array network is acquired, and whether the coupling capacitor is in a wet state is determined according to the real-time feature data output by the coupling capacitor and the corresponding reference feature data. In this way, after a touch panel of a terminal is in a wet state, the touch functions can be selectively adjusted, or a part of power supplies in the circuit can be closed.

BRIEF DESCRIPTION OF THE DRAWINGS

FIG. 3 to FIG. 5 are tables of data of capacitance reference values, data of real-time capacitance values and data of capacitance differences respectively according to a specific example of a mutual-capacitor according to Embodiment 1 of the present disclosure;

DETAILED DESCRIPTION

Practice of the present application is described in detail with reference to drawings and specific embodiments, such that the practice of addressing the technical problem using the technical means according to the present application and achieving the technical effects may be better understood and conducted.

In embodiments of the present disclosure hereinafter, reference feature data counted according to sample feature data output by a coupling capacitor when a medium between electrodes of each coupling capacitor in a capacitor array network is air is acquired; and real-time feature data output by the coupling capacitor in the capacitor array network is acquired, and whether the corresponding coupling capacitor is in a wet state when flooded or immersed in the water is determined according to the real-time feature data output by the coupling capacitor and the corresponding reference feature data. In this way, after a touch panel of a terminal is in a wet state, the touch functions are selectively adjusted, or a part of power supplies in the circuit are closed.

Figure 1:
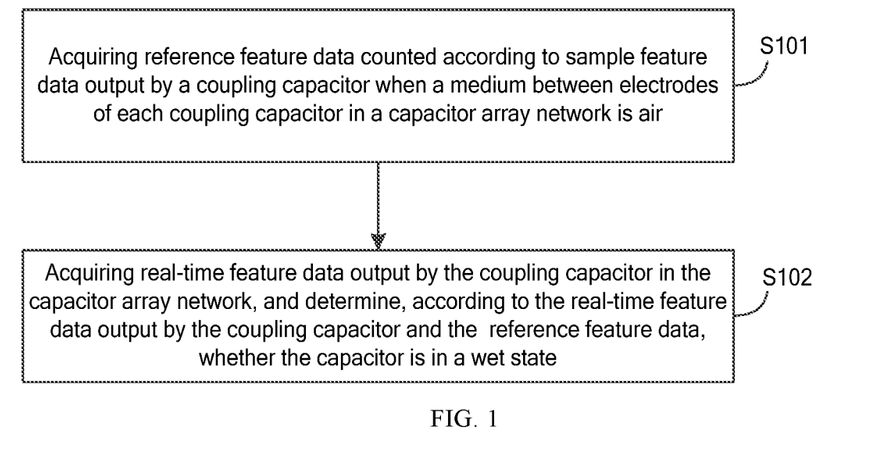
FIG. 1 is a schematic flowchart of a wet state detection method according to Embodiment 1 of the present disclosure.

FIG. 1 is a schematic flowchart of a wet state detection method according to Embodiment 1 of the present disclosure. As illustrated in FIG. 1, the method includes the following steps:

S101: acquiring reference feature data counted according to sample feature data output by a coupling capacitor when a medium between electrodes of the coupling capacitor in a capacitor array network is air;

In this embodiment, the capacitor array network of a touch panel may be formed of a driving electrode and a sensing electrode, and the coupling capacitor may refer to a capacitor node formed between the driving electrode and the sensing electrode. As compared with the case where the medium between the electrodes of the coupling capacitor is air, in case of no finger touch, if the medium between the driving electrode and the sensing electrode is water, the feature data output by the coupling capacitor may become smaller. Accordingly, the capacitor array network is directly placed into water, and sample feature data output by the coupling capacitor is measured. The sample feature data reflects a capacitance value, which for example, may be a voltage signal output by the capacitor or a digitalization result of the voltage signal. The sample feature data is statistically collected to obtain the reference feature data.

S102: acquiring real-time feature data output by the coupling capacitor in the capacitor array network, and determining whether the coupling capacitor is in a wet state according to the real-time feature data output by the coupling capacitor and the reference feature data.

As described above, before and after the touch panel enters into the water, the real-time feature data output by the same coupling capacitor may become smaller. That is, in case of no touch, before the touch panel enters into the water, the feature data output by the coupling capacitor is the reference feature data, whereas after the touch panel enters into the water, the feature data output by the coupling capacitor may relatively becomes smaller. Therefore, in this embodiment, in step S102, a value of the real-time feature data is compared with a value of the reference feature data; and if the value of the real-time feature data is less than the value of the reference feature data, it is determined that the corresponding coupling capacitor is in the wet state.

Figure 2:
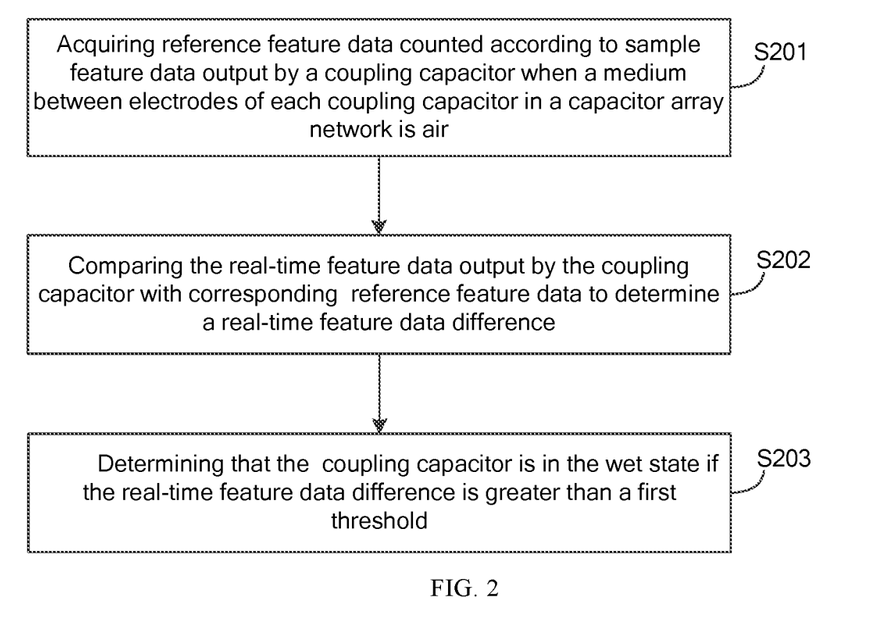
FIG. 2 is a schematic flowchart of a wet state detection method according to Embodiment 2 of the present disclosure.

FIG. 2 is a schematic flowchart of a wet state detection method according to Embodiment 2 of the present disclosure. As illustrated in FIG. 2, the method includes the following steps:

S201: acquiring reference feature data counted according to sample feature data output by coupling capacitors when a medium between electrodes of each coupling capacitor in a capacitor array network is air;

S202: comparing real-time feature data output by the coupling capacitor with corresponding reference feature data to determine a real-time feature data difference;

In this embodiment, to improve the accuracy of wet state detection, the real-time feature data output by the coupling capacitor is compared with the corresponding reference feature data to determine the real-time feature data difference.

S203: determining that the coupling capacitor is in the wet state if the real-time feature data difference is greater than a first threshold.

In this embodiment, the sample feature data output by the coupling capacitor may be acquired by directly placing the capacitor array network into water, and differences between the sample feature data output by the coupling capacitor and the corresponding reference feature data is calculated to obtain sample feature data differences. A statistical calculation is performed for these differences to determine the first threshold. For example, the first threshold is obtained by performing an average operation for the sample feature data differences of all the coupling capacitors.

TABLE 1

Data of real-time capacitance values of mutual-capacitors in an N × M capacitor array

| A00 | A01 | A02 | A03 | ... | ... A0 (M − 3) | A0 (M − 2) | A0 (M − 1) |
|---|---|---|---|---|---|---|---|
| A10 | A11 | A12 | A13 | ... | ... A1 (M − 3) | A1 (M − 2) | A1 (M − 1) |
| A20 | A21 | A22 | A23 | ... | ... A2 (M − 3) | A2 (M − 2) | A2 (M − 1) |
| ... | ... | ... | ... | ... | ... ... | ... | ... |
| A (N − 2) 0 | A (N − 2) 1 | A (N − 2) 2 | A (N − 2) 3 | ... | ... A (N − 2) (M − 3) | A (N − 2) (M − 2) | A (N − 2) (M − 1) |
| A (N − 1) 0 | A (N − 1) 1 | A (N − 1) 2 | A (N − 1) 3 | ... | ... A (N − 1) (M − 3) | A (N − 1) (M − 2) | A (N − 1) (M − 1) |

Referring to Table 1, there are N rows of driving detection channels and M rows of sensing detection channel, and thus N×M mutual-capacitors are formed. Data of real-time capacitance value of the N×M mutual-capacitors is A00 . . . A(N−1)(M−1) respectively. The data of these capacitance values may be regarded as the real-time feature data.

TABLE 2

Data of real-time capacitance values of self-capacitors in an N × M capacitor array

| CX0 | CX 1 | CX 2 | CX 3 ... | ... CX (N − 3) | CX (N − 2) | CX (N − 1) |
|---|---|---|---|---|---|---|
| CY0 | CY 1 | CY 2 | CY 3 ... | ... CY (M − 3) | CY (M − 2) | CY (M − 1) |

Referring to Table 2, there are N grounding capacitors in the X direction, and M channels in the Y direction, that is, M grounding capacitors in the Y direction and thus there are totally N+M self-capacitors. Data of real-time capacitance value of the N+M self-capacitors is CX0 . . . CX (N−1), CY0 CY(M−1) respectively. The data of these capacitance values can be regarded as the real-time feature data.

TABLE 3

Data of capacitance differences of mutual-capacitors in an N × M capacitor array after the touch panel enters into water

| D00 | D01 | D02 | D03 | ... | ... D0 (M − 3) | D0 (M − 2) | D0 (M − 1) |
|---|---|---|---|---|---|---|---|
| D10 | D11 | D12 | D13 | ... | ... D1 (M − 3) | D1 (M − 2) | D1 (M − 1) |
| D20 | D21 | D22 | D23 | ... | ... D2 (M − 3) | D2 (M − 2) | D2 (M − 1) |
| ... | ... | ... | ... | ... | ... ... | ... | ... |
| D (N − 2) 0 | D (N − 2) 1 | D (N − 2) 2 | D (N − 2) 3 | ... | ... D (N − 2) (M − 3) | D (N − 2) (M − 2) | D (N − 2) (M − 1) |
| D (N − 1) 0 | D (N − 1) 1 | D (N − 1) 2 | D (N − 1) 3 | ... | ... D (N − 1) (M − 3) | D (N − 1) (M − 2) | D (N − 1) (M − 1) |

Referring to Table 3, in the case of mutual-capacitors, data of differences between the real-time capacitance values after the touch panel enters into the water and the mutual-reference capacitance values before the touch panel enters into the water and is in no contact with the water is D20 . . . D(N−1)(M−1), and these differences are used as the feature data differences.

TABLE 4

Data of capacitance differences of self-capacitors in an N × M capacitor array

| EX0 | EX 1 | EX 2 | EX 3 ... | EX (N − 3) | EX (N − 2) | EX (N − 1) |
|---|---|---|---|---|---|---|
| EY0 | EY 1 | EY 2 | EY 3 ... | ... EY (M − 3) | EY (M − 2) | EY (M − 1) |

Referring to Table 4, in the case of self-capacitors, data of difference between the real-time capacitance value after the touch panel enters into the water and reference capacitance value before the touch panel enters into the water without been touched is EX0 . . . EX (N−1), EY0 . . . EY (M−1), and these differences are regarded as the feature data differences.

Figure 3:
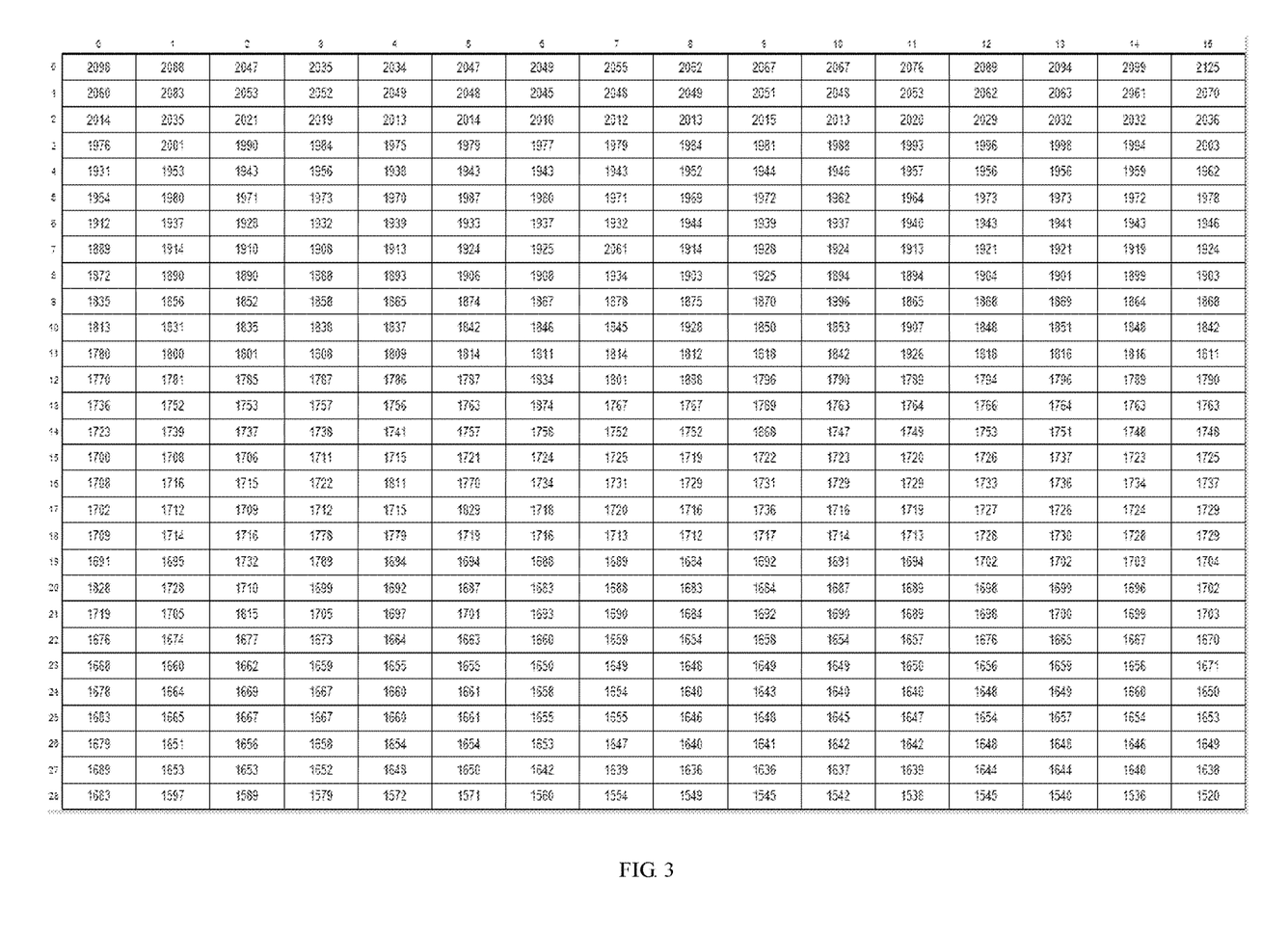

FIG. 3 to FIG. 5 are tables of data of capacitance reference values, data of real-time capacitance values and data of capacitance differences respectively according to a specific example of a mutual-capacitor according to Embodiment 1 of the present disclosure.

Referring to FIG. 3 to FIG. 5, after the touch panel enters into water, the real-time capacitance values output by the mutual-capacitors are partially abruptly reduced. Referring to FIG. 5, the capacitance differences output by the mutual-capacitors not flooded with water are relatively smaller, which may be even ignored. However, the capacitance differences output by the mutual-capacitors flooded with water are relatively greater. In a specific embodiment, to differentiate the mutual-capacitors flooded water from the mutual-capacitors not flooded with water, the first threshold may be defined to 111, such that the wet state may be relatively accurately differentiated. The first threshold may be obtained by using the method as described in Embodiment 2, which is thus not described herein any further. It should be noted that, it is only required that the specific data in FIG. 3 to FIG. 5 reflects the capacitance values of the mutual-capacitors, which are related to the specific detection circuit, and are thus not described herein any further.

Figure 6:
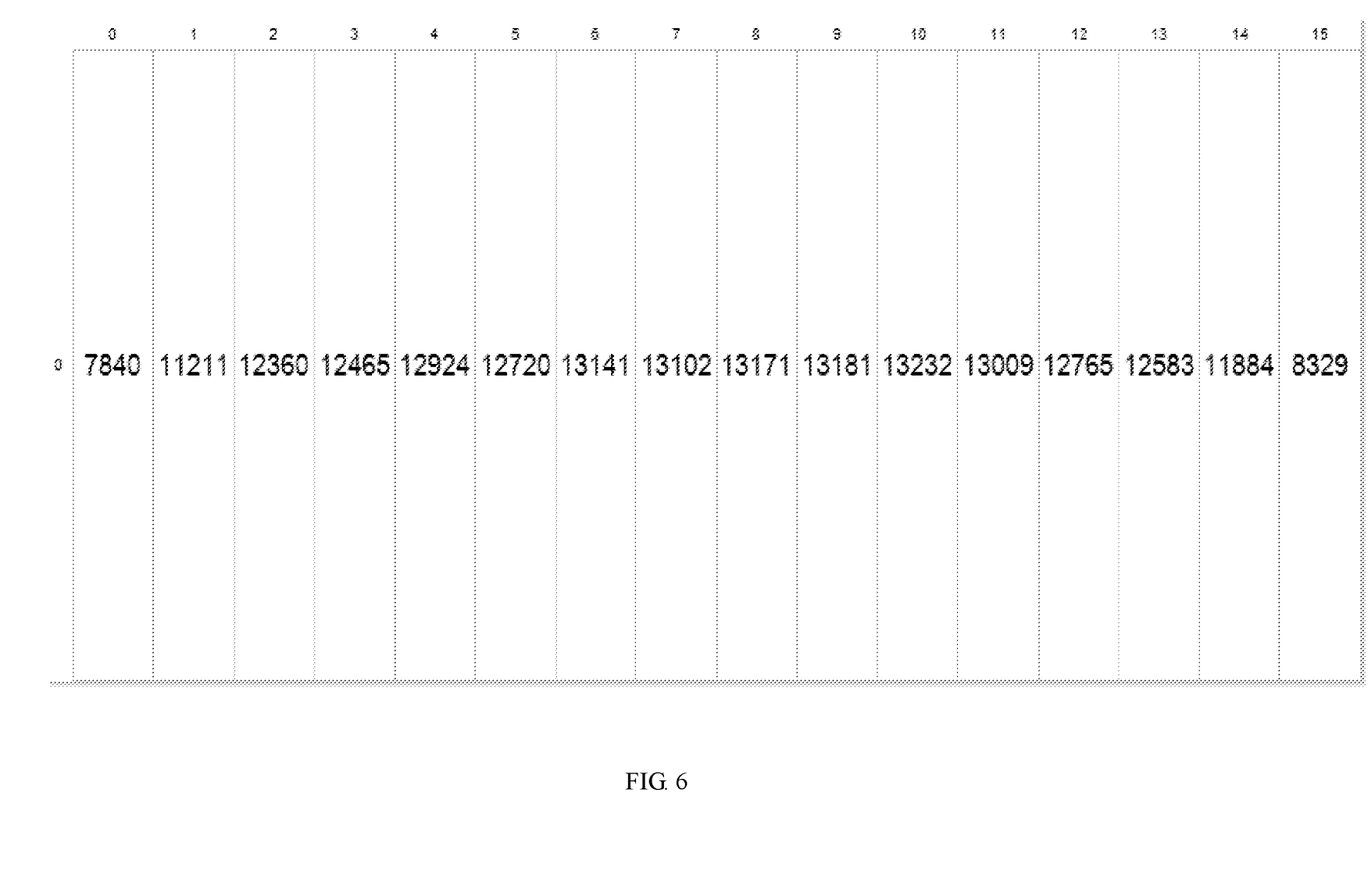
FIG. 6 to FIG. 8 are tables of data of capacitance reference values, data of real-time capacitance values and data of capacitance differences respectively according to a specific example of a self-capacitor according to Embodiment 1 of the present disclosure.
Figure 7:
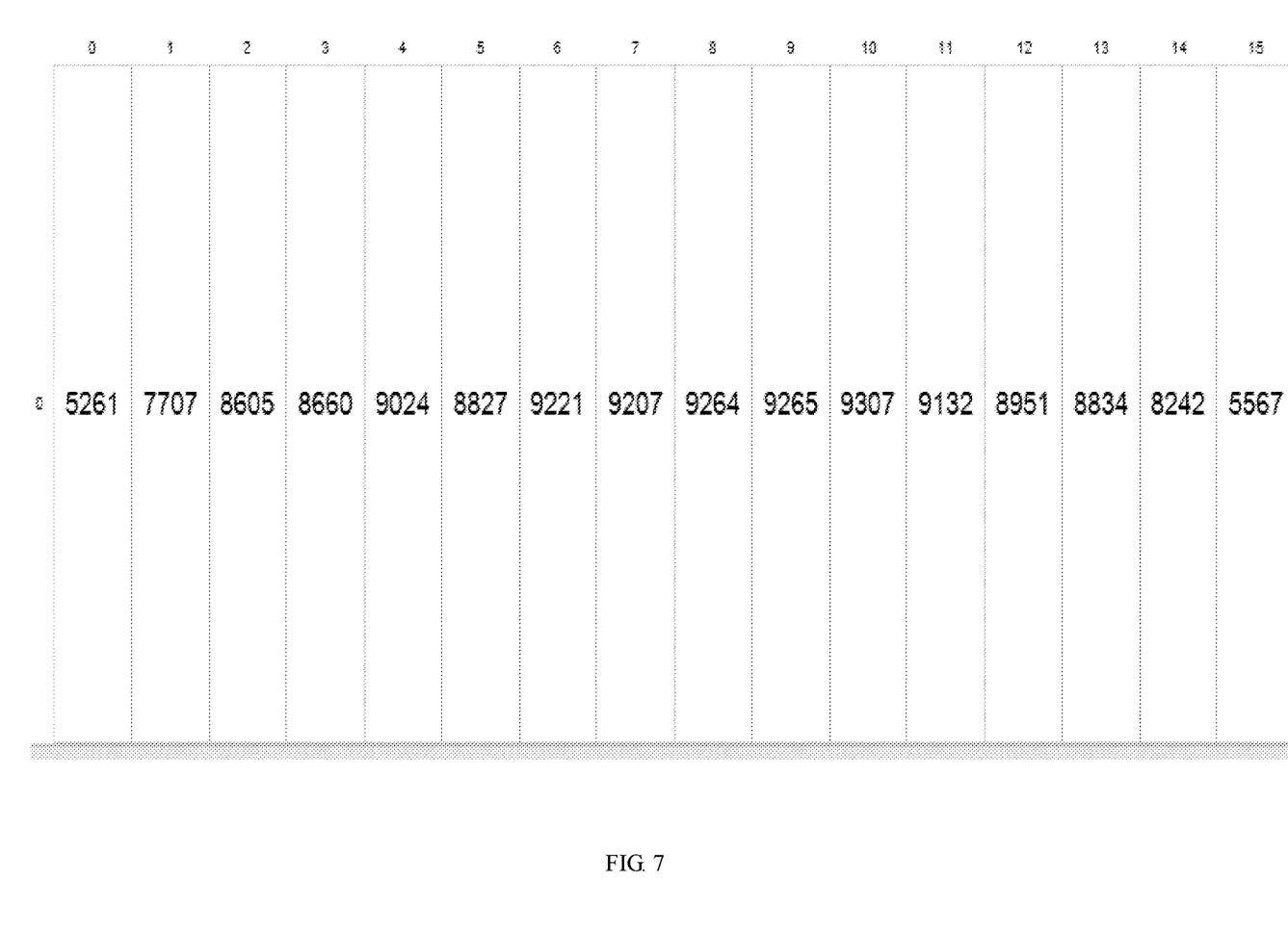
Figure 8:
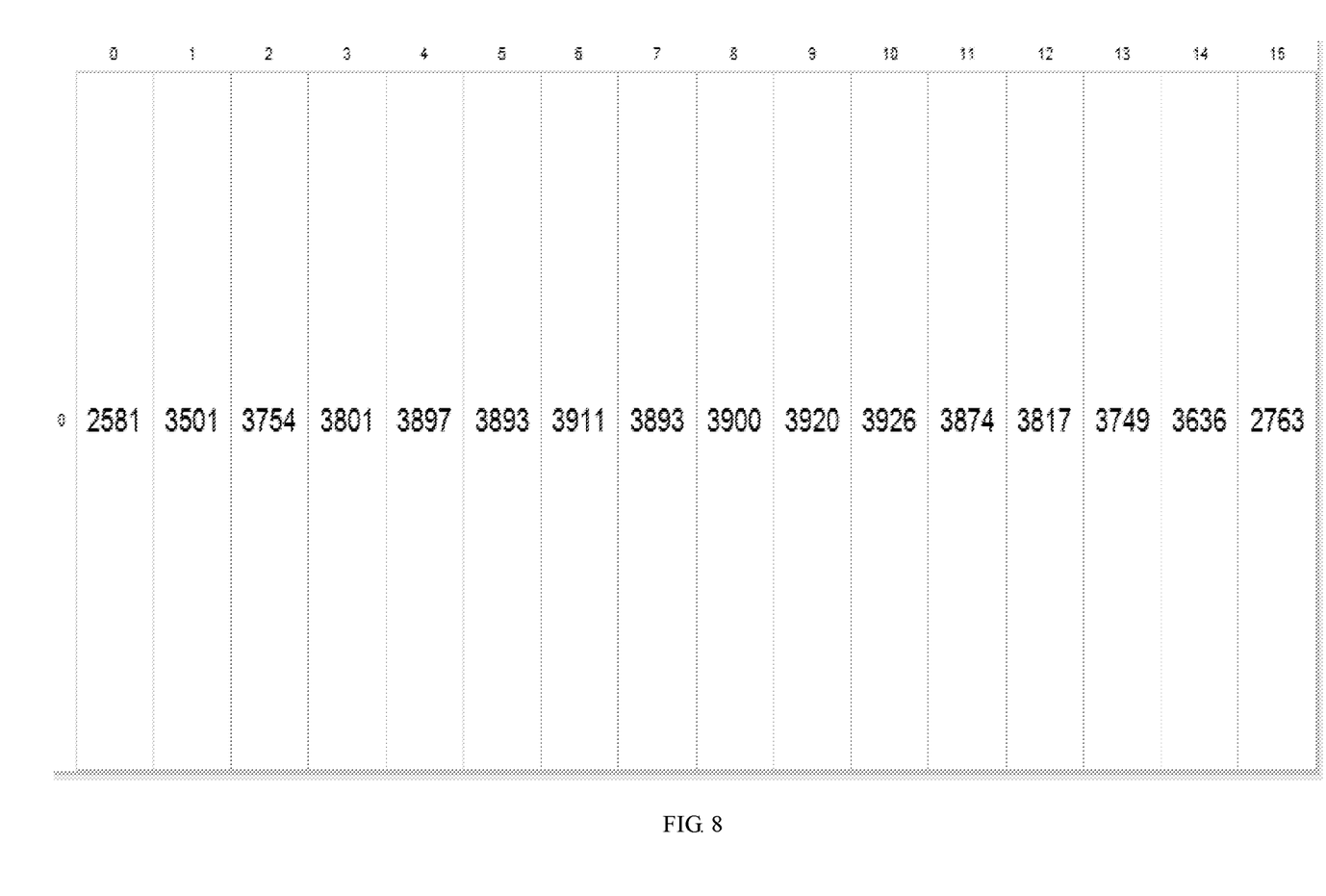

FIG. 6 to FIG. 8 are tables of data of capacitance reference values, data of real-time capacitance values and data of capacitance differences according to a specific example of a self-capacitor according to Embodiment 1 of the present disclosure. Referring to the above case of the mutual-capacitor, the first threshold applicable to the situation of self-capacitor may be 2549.

In this embodiment, a wet region position may also be determined according to coordinates of the coupling capacitor in the wet state; and/or a total area of a wet region may be determined according the number of coupling capacitors in the wet state.

Figure 9:
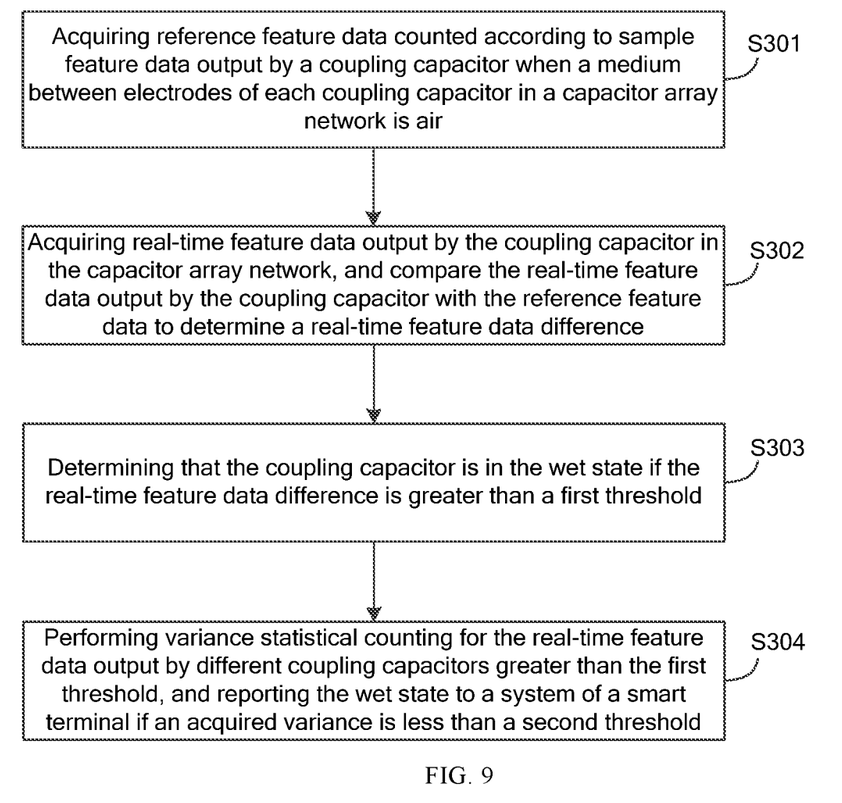
FIG. 9 is a schematic flowchart of a wet state detection method according to Embodiment 3 of the present disclosure.

FIG. 9 is a schematic flowchart of a wet state detection method according to Embodiment 3 of the present disclosure. As illustrated in FIG. 9, the method may include the following steps:

S301: acquiring reference feature data counted according to sample feature data output by a coupling capacitor when a medium between electrodes of each coupling capacitor in a capacitor array network is air;

S302: acquiring real-time feature data output by the coupling capacitor in the capacitor array network, and comparing the real-time feature data output by the coupling capacitor with a corresponding reference feature data to determine a real-time feature data difference;

S303: determining that the coupling capacitor is in the wet state if the real-time feature data difference is greater than a first threshold.

In this embodiment, steps S301 to S303 may be referenced to the above embodiments, which are thus not described herein any further.

S304: performing variance statistical counting for the real-time feature data differences output by different coupling capacitors greater than the first threshold, and reporting the wet state to a system of a smart terminal if an acquired variance is less than a second threshold.

In this embodiment, different from the above embodiments, relative to the case where variations of the capacitances of the coupling capacitors are caused by finger touch on the touch panel, considering that the water contacts at various positions are relatively consistent, the variance of the variations of the capacitances of the coupling capacitors may be relatively smaller, that is, the variances of the feature data differences are smaller. Therefore, in this embodiment, using the method for statistically calculating the first threshold as described above, the second threshold may be calculated. The variances of the differences of the feature data are compared with the second threshold to further determine the wet state, and further report the wet state to the system. The system prevents mis-operations by adjusting the touch operation function according to the specific circumstances of the wet state, for example, the total area of the wet region and the position of the wet region, or prevents damages caused to the terminal by further partially closing the power supply of the terminal.

Figure 10:
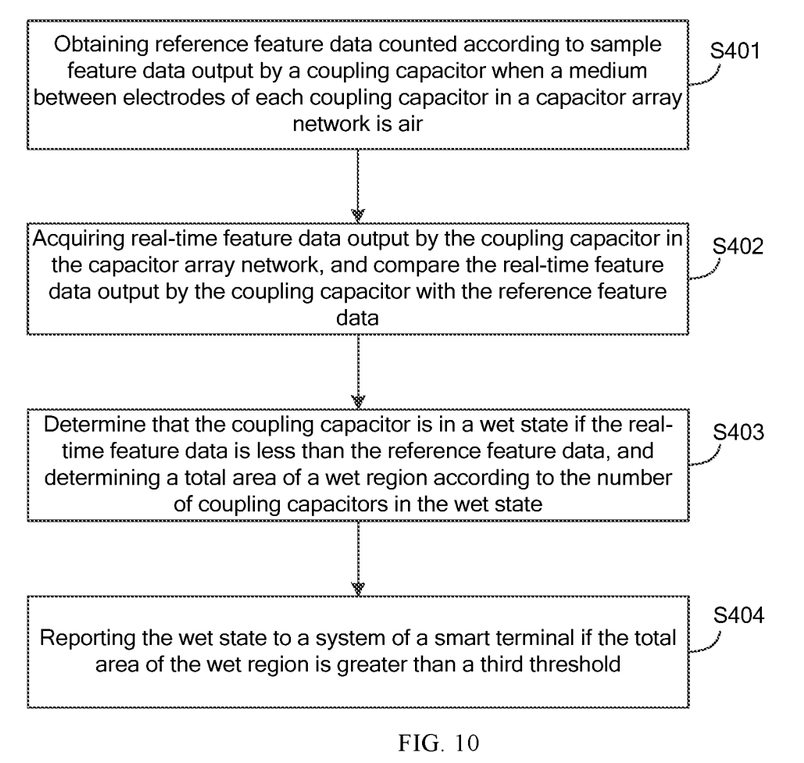
FIG. 10 is a schematic flowchart of a wet state detection method according to Embodiment 4 of the present disclosure.

FIG. 10 is a schematic flowchart of a wet state detection method according to Embodiment 4 of the present disclosure. As illustrated in FIG. 10, the method includes the following steps:

S401: obtaining reference feature data counted according to sample feature data output by a coupling capacitor when a medium between electrodes of each coupling capacitor in a capacitor array network is air;

S402: acquiring real-time feature data output by the coupling capacitor in the capacitor array network, and comparing the real-time feature data output by the coupling capacitor with the reference feature data;

S403: determining that the coupling capacitor is in a wet state if the real-time feature data is less than the reference feature data, and determining a total area of a wet region according to the number of coupling capacitors in the wet state;

In this embodiment, steps S401 to S403 may be referenced to the above embodiments, which are thus not described herein any further.

S404: reporting the wet state to a system of a smart terminal if the total area of the wet region is greater than a predetermined third threshold.

In this embodiment, the third threshold may be used as a judgment criterion for determining severity of the wet state, and the third threshold may be user-defined. If the total area of the wet region is less than the third threshold, it is determined that the current wet state may cause no impact to the terminal. If the total area of the wet region is greater than the third threshold, it is determined that the wet state may cause impacts to the terminal. In this case, the wet state is reported to the system of the smart terminal. The system prevents misoperations by adjusting the touch operation function according to the specific circumstances of the wet state, for example, the total area of the wet region and the position of the wet region, or prevents damages caused to the terminal by further partially closing the power supply of the terminal.

Figure 11:
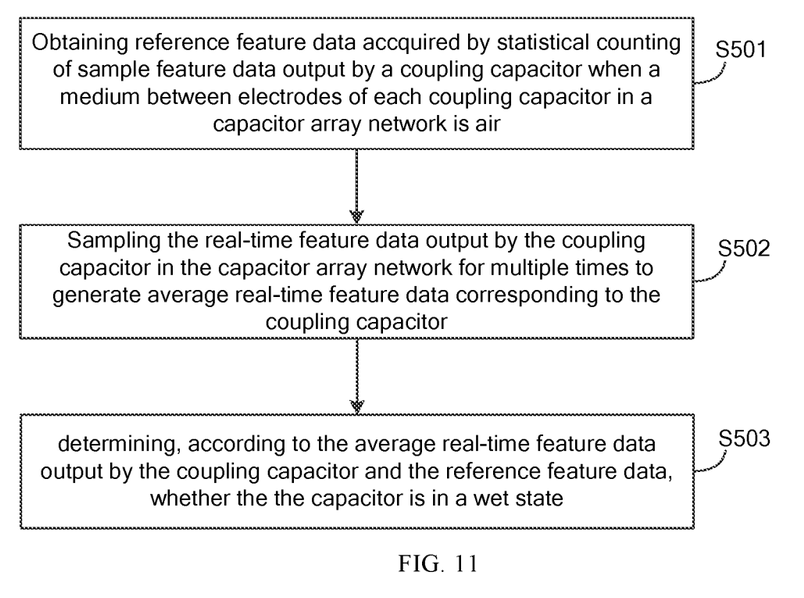
FIG. 11 is a schematic flowchart of a wet state detection method according to Embodiment 5 of the present disclosure.

FIG. 11 is a schematic flowchart of a wet state detection method according to Embodiment 5 of the present disclosure. As illustrated in FIG. 11, the method includes the following steps:

S501: obtaining reference feature data acquired by statistical counting of sample feature data output by coupling capacitors when a medium between electrodes of each coupling capacitor in a capacitor array network is air;

S502: sampling the real-time feature data output by the coupling capacitor in the capacitor array network for multiple times to generate average real-time feature data corresponding to the coupling capacitor.

The sampling the real-time feature data output by the coupling capacitor in the capacitor array network for multiple times to generate the average real-time feature data corresponding to the coupling capacitor in step S502 may include: performing de-bounce for the real-time feature data acquired via sampling, and generating the average real-time feature data corresponding to the coupling capacitor according to the de-bounced real-time feature data. By means of de-bounce, instabilities during the touch panel entering into the water may be avoided, and inaccurate data due to abrupt changes of the real-time feature data may be prevented.

In this embodiment, the sampling frequency for sampling the real-time feature data for multiple times is higher than a sampling frequency before the touch panel is wetted. For example, the sampling frequency is improved by controlling a refresh frequency, and thus sampling accuracy of the real-time feature data is improved.

S503: determining whether the coupling capacitor is in a wet state according to the average real-time feature data output by the coupling capacitor and reference feature data.

In this embodiment, it is determined that the coupling capacitor is in the wet state if a value of the average real-time feature data is less than a value of the reference feature data.

In this embodiment or another embodiment, a wet region position is determined according to coordinates of the coupling capacitor in the wet state; and/or a total area of a wet region is determined according the number of coupling capacitors in the wet state.

Alternatively, in another embodiment, the average real-time feature data output by the coupling capacitor is compared with the corresponding reference feature data to determine a real-time feature data difference; and it is determined that the corresponding coupling capacitor is in the wet state if the real-time feature data difference is greater than the first threshold.

Referring to the above embodiments, based on the embodiment illustrated in FIG. 11, in another embodiment, the method further includes: performing variance statistical counting for the real-time feature data differences greater than the first threshold output by different coupling capacitors, and reporting the wet state to a system of a smart terminal if the variance is less than the second threshold.

>Referring to the above embodiments, based on the embodiment illustrated in FIG. 11, in another embodiment, the wet state is reported to a system of a smart terminal if the total area of the wet region is greater than the third threshold.

Referring to the above embodiments, the capacitor array network is a self-capacitor array network, and the coupling capacitor is a self-capacitor; or the capacitor array network is a mutual-capacitor array network, and the coupling capacitor is a mutual-capacitor.

Figure 12:
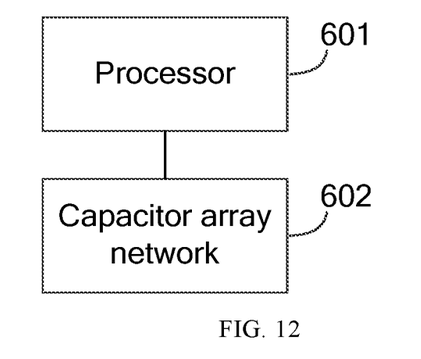
FIG. 12 is a schematic structural diagram of a capacitive touch apparatus according to Embodiment 6 of the present disclosure.

FIG. 12 is a schematic structural diagram of a capacitive touch apparatus according to Embodiment 6 of the present disclosure. As illustrated in FIG. 12, the capacitive touch apparatus includes: a processor 601 and a capacitor array network 602; wherein the processor is configured to acquire reference feature data counted according to sample feature data output by a coupling capacitor when a medium between electrodes of each coupling capacitor in a capacitor array network is air; and acquire real-time feature data output by the coupling capacitor in the capacitor array network, and determine whether the coupling capacitor is in a wet state according to the real-time feature data output by the coupling capacitor and a corresponding reference feature data.

In this embodiment or another embodiment, the processor 601 is further configured to determine that the corresponding coupling capacitor is in the wet state if a value of the real-time feature data is less than a value of the reference feature data. Alternatively, the processor is further configured to compare the real-time feature data output by the coupling capacitor with the corresponding reference feature data to determine a real-time feature data difference; and determine that the corresponding coupling capacitor is in the wet state if the real-time feature data difference is greater than a first threshold.

Further, in this embodiment or another embodiment, the processor 601 is further configured to perform variance counting for the real-time feature data output by different coupling capacitor which is greater than the first threshold, and report the wet state to a system of a smart terminal if the acquired variance is less than a second threshold.

Further, in this embodiment or another embodiment, the processor 601 is further configured to determine a wet region position according to coordinates of the coupling capacitor in the wet state; and/or determine a total area of a wet region according the number of coupling capacitors in the wet state.

Further, in this embodiment or another embodiment, the processor 601 is further configured to report the wet state to a system of a smart terminal if the total area of the wet region is greater than a predetermined third threshold.

Alternatively, in this embodiment or another embodiment, the processor 601 is further configured to sample the real-time feature data output by the coupling capacitor in the capacitor array network for multiple times to generate average real-time feature data corresponding to the coupling capacitor, and determine, according to the average real-time feature data output by the coupling capacitor and the reference feature data, whether the corresponding coupling capacitor is in the wet state.

Further, in this embodiment or another embodiment, the processor 601 is further configured to perform de-bouncing for the real-time feature data acquired via sampling, and generate the average real-time feature data corresponding to the coupling capacitor according to the de-bounced real-time feature data.

Further, in this embodiment or another embodiment, the processor 601 is further configured to determine that the corresponding coupling capacitor is in the wet state if a value of the average real-time feature data is less than a value of the reference feature data.

Alternatively, in this embodiment or another embodiment, the processor 601 is further configured to compare the average real-time feature data output by the coupling capacitor with the corresponding reference feature data to determine an average real-time feature data difference; and determine that the corresponding coupling capacitor is in the wet state if the average real-time feature data difference is greater than the first threshold.

Further, in this embodiment or another embodiment, the processor 601 is further configured to perform variance statistical calculation for the real-time feature data greater than the first threshold, and report the wet state to a system of a smart terminal if the acquired variance is less than the second threshold.

Figure 13:
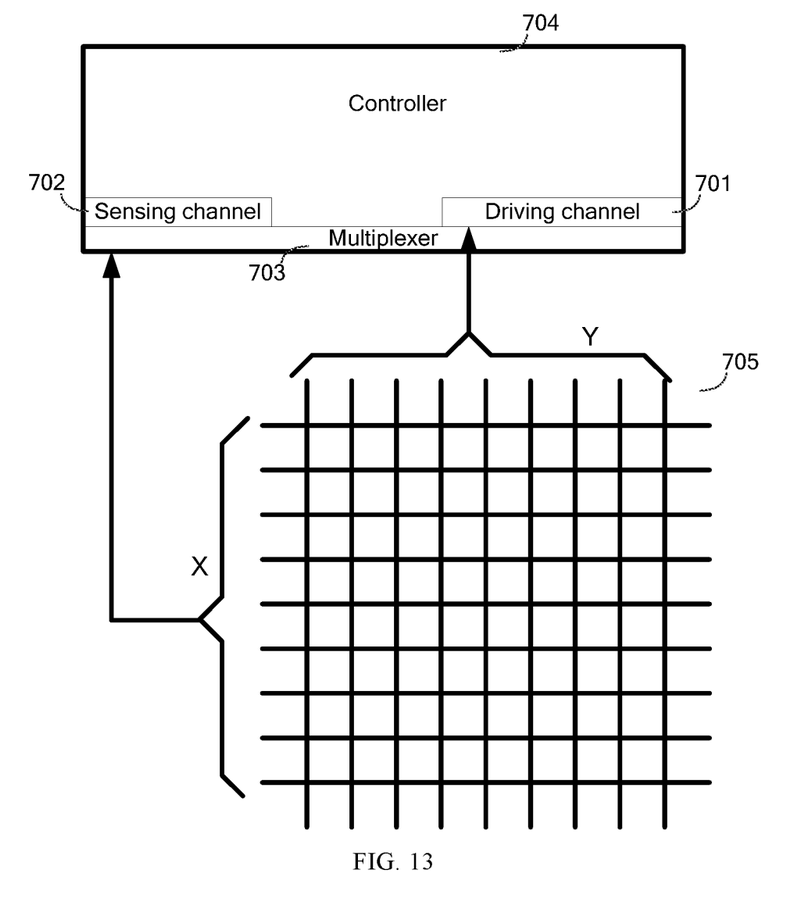
FIG. 13 is a schematic structural diagram of a capacitive touch apparatus according to Embodiment 7 of the present disclosure.

FIG. 13 is a schematic structural diagram of a capacitive touch apparatus according to Embodiment 7 of the present disclosure. As illustrated in FIG. 13, this embodiment takes the example where the coupling capacitors are mutual-capacitors as an example. That is, the capacitor array network is a mutual-capacitor array network. The capacitor array network includes: a driving channel 701, a sensing channel 702, a multiplexer 703, a controller 704, and a mutual-capacitor array network 705. The driving channel 701 is configured to provide a driving signal for the coupling capacitor. The sensing channel 702 is configured to receive an output signal from the coupling capacitor. The multiplexer 703 is configured to enable a plurality of coupling capacitors to multiplex the same driving channel 701 or the same sensing channel 702. The controller 704 is configured to acquire reference feature data obtained by statistical calculation or counting of sample feature data output by a coupling capacitor when a medium between electrodes of each coupling capacitor in the capacitor array network 705 is air; and acquire real-time feature data output by the coupling capacitor in the capacitor array network, and determine, according to the real-time feature data and the corresponding reference feature data, whether the coupling capacitor is in a wet state.

Detailed description of the controller 704 may be referenced to the related disclosure of the processor in the above embodiments, which is thus not described herein any further.

The apparatus according to the embodiments of the present application may be practiced by a computer program. A person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present disclosure is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A method for detecting whether a touch panel of a terminal is immersed in water, wherein the touch panel of the terminal includes a capacitor array network, the method comprising:
    acquiring reference feature data counted according to sample feature data output by a coupling capacitor when a medium between electrodes of each coupling capacitor in the capacitor array network is air; and
    acquiring real-time feature data output by the coupling capacitor in the capacitor array network, and
    determining, according to the real-time feature data output by the coupling capacitor and the reference feature data, whether the touch panel of the terminal is immersed in water, wherein:
    when the real-time feature data minus corresponding reference feature data is less than a first threshold that is a negative value and a variance in differential between the real-time feature data and the corresponding reference feature data is less than a second threshold, determine that the touch panel of the terminal is immersed in water; or, when the real-time feature data is less than the corresponding reference feature data and the variance in differential between the real-time feature data and the corresponding reference feature data is less than the second threshold, determine that the touch panel of the terminal is immersed in water.

2. The method according to claim 1, further comprising: determining a wet region position according to coordinates of the coupling capacitor in the wet state; or determining a total area of a wet region according the number of coupling capacitors in the wet state.

3. The method according to claim 2, further comprising: reporting the wet state to a system of a smart terminal if the total area of the wet region is greater than a predetermined third threshold.

4. The method according to claim 1, wherein the capacitor array network is a selfcapacitor array network, and the coupling capacitor is a self-capacitor; or the capacitor array network is a mutual-capacitor array network, and the coupling capacitor is a mutual-capacitor.

5. The method according to claim 1, wherein the determining, according to the real-time feature data output by the coupling capacitor and the reference feature data, whether the coupling capacitor is in a wet state comprises:
    sampling the real-time feature data output by the coupling capacitor in the capacitor array network for multiple times to generate average real-time feature data corresponding to the coupling capacitor, and determining, according to the average real-time feature data output by the coupling capacitor and the reference feature data, whether the coupling capacitor is in the wet state.

6. The method according to claim 5, wherein the determining, according to the average real-time feature data output by the coupling capacitor and the reference feature data, whether the coupling capacitor is in a wet state comprises: determining that the coupling capacitor is in the wet state if a value of the average real-time feature data is less than a value of the reference feature data; or determining that the coupling capacitor is in the wet state if a real-time feature data difference between the average real-time feature data and the reference feature data is greater than a first threshold.

7. The method according to claim 6, further comprising: performing variance statistical counting for the real-time feature data differences output by different coupling capacitors greater than the first threshold, and reporting the wet state to a system of a smart terminal if the acquired variance is less than a second threshold.

8. The method according to claim 5, wherein the sampling the real-time feature data output by the coupling capacitor in the capacitor array network for multiple times to generate average real-time feature data corresponding to the coupling capacitor comprises: performing debouncing for the real-time feature data acquired via sampling, and generating the average realtime feature data corresponding to the coupling capacitor according to de-bounced real-time feature data.

9. The method according to claim 5, wherein a sampling frequency for sampling the real-time feature data for multiple times is higher than a sampling frequency before the touch panel is flooded.

10. A capacitive touch apparatus, comprising
    a processor; and
    a capacitor array network;
    wherein the processor is configured to:
        acquire reference feature data obtained by statistical counting of sample feature data output by a coupling capacitor when a medium between electrodes of each coupling capacitor in a capacitor array network is air; and
        acquire real-time feature data output by the coupling capacitor in the capacitor array network, and
        determine, according to the real-time feature data output by the coupling capacitor and the reference feature data, whether the coupling capacitor is immersed in water,
    wherein:
    when the real-time feature data minus corresponding reference feature data is less than a first threshold that is a negative value and a variance in differential between the real-time feature data and the corresponding reference feature data is less than a second threshold, determine that the coupling capacitor is immersed in water; or, when the real-time feature data is less than the corresponding reference feature data and the variance in differential between the real-time feature data and the corresponding reference feature data is less than the second threshold, determine that the coupling capacitor is immersed in water.

11. The apparatus according to claim 10, wherein the processor is further configured to determine a wet region position according to coordinates of the coupling capacitor in the wet state; and determine a total area of a wet region according the number of coupling capacitors in the wet state.

12. The apparatus according to claim 11, wherein the processor is further configured to report the wet state to a system of a smart terminal if the total area of the wet region is greater than a predetermined third threshold.

13. The apparatus according to claim 10, wherein the processor is further configured to sample the real-time feature data output by the coupling capacitor in the capacitor array network for multiple times to generate average real-time feature data corresponding to the coupling capacitor, and determine, according to the average real-time feature data output by the coupling capacitor and the reference feature data, whether the coupling capacitor is in the wet state.

14. The apparatus according to claim 13, wherein the processor is further configured to determine that the coupling capacitor is in the wet state if a value of the average real-time feature data is less than a value of the reference feature data; or determine that the coupling capacitor is in the wet state if a real-time feature data difference between the average real-time feature data and the reference feature data is greater than a first threshold.

15. The apparatus according to claim 14, wherein the processor is further configured to perform variance statistical counting for the real-time feature data differences output by different coupling capacitors greater than the first threshold, and report the wet state to a system of a smart terminal if the acquired variance is less than a second threshold.

16. The apparatus according to claim 13, wherein the processor is further configured to determine a wet region position according to coordinates of the coupling capacitor in the wet state, determine a total area of a wet region according the number of coupling capacitors in the wet state, and report the wet state to a system of a smart terminal if the total area of the wet region is greater than a predetermined third threshold.

* * * * *